A. P. WOLFE.
ROLL FOR CORN HUSKING MACHINES AND THE LIKE.
APPLICATION FILED APR. 17, 1908.
959,904.
Patented May 31, 1910.
2 SHEETS—SHEET 1.
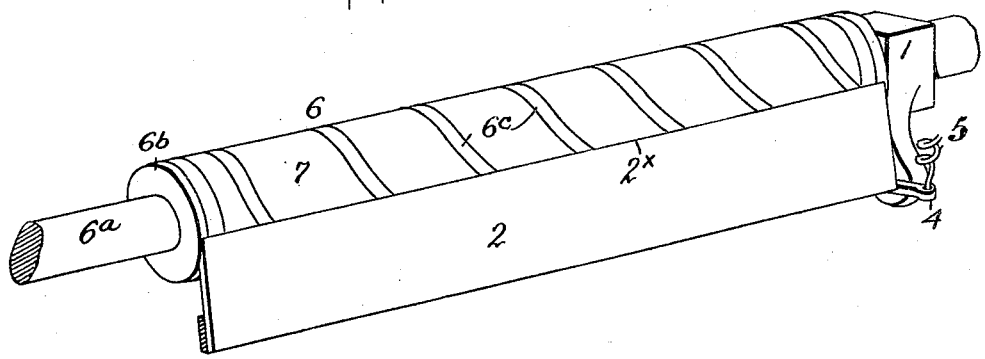
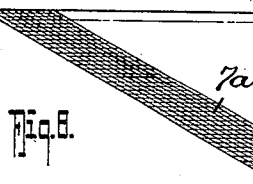
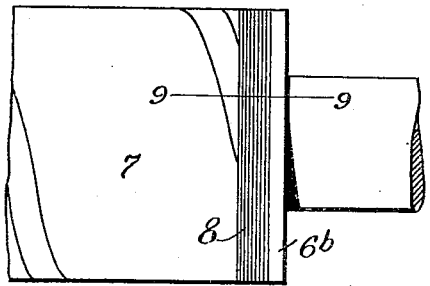
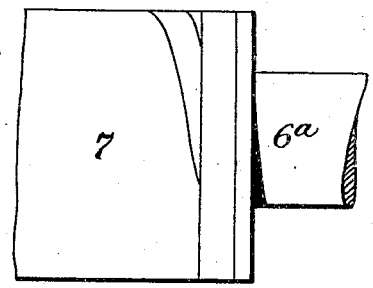
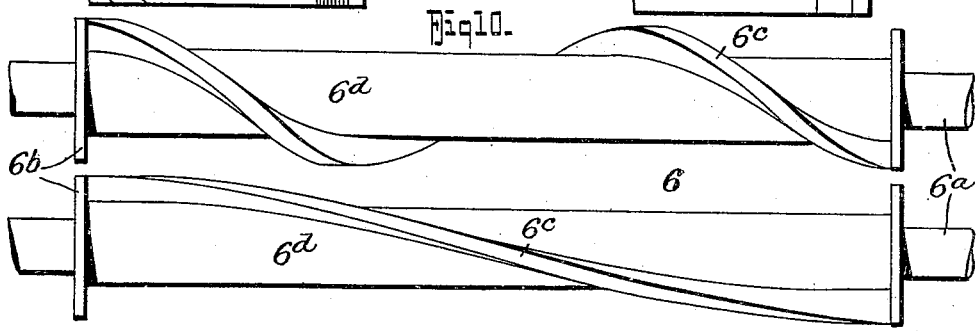
WITNESSES:
John T. Schrott
J. H. Woodard
INVENTOR
Arthur P. Wolfe.
BY
Fred G. Dieterich & Co.
ATTORNEYS.

A. P. WOLFE.
ROLL FOR CORN HUSKING MACHINES AND THE LIKE.
APPLICATION FILED APR. 17, 1908.
959,904.
Patented May 31, 1910.
2 SHEETS—SHEET 2.
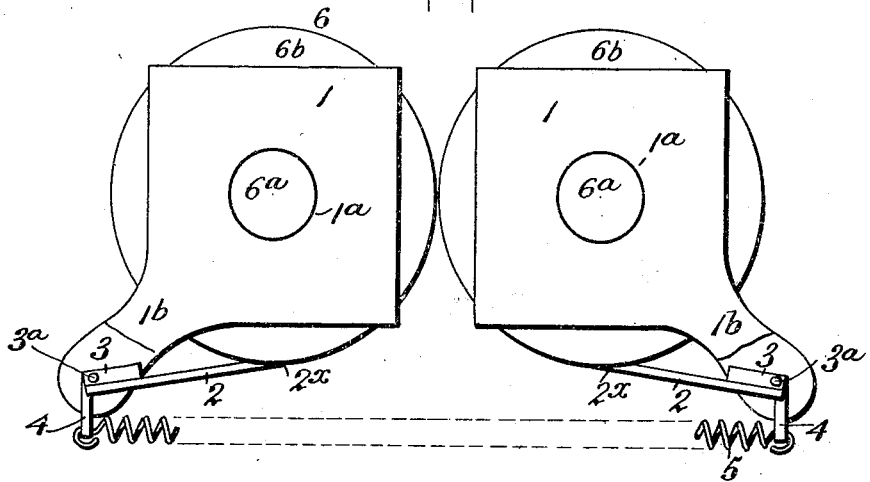
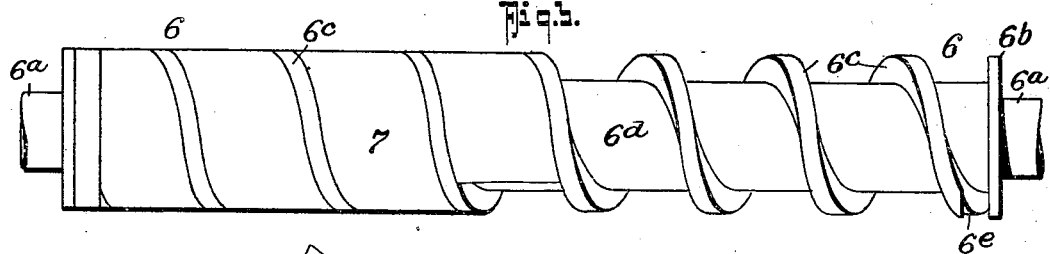
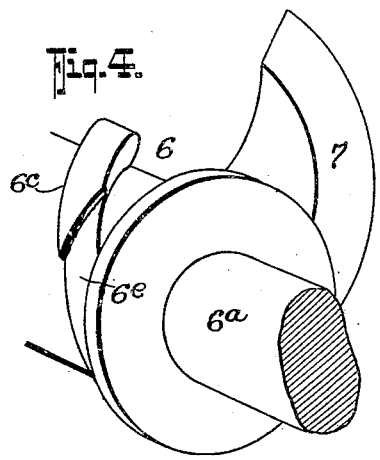
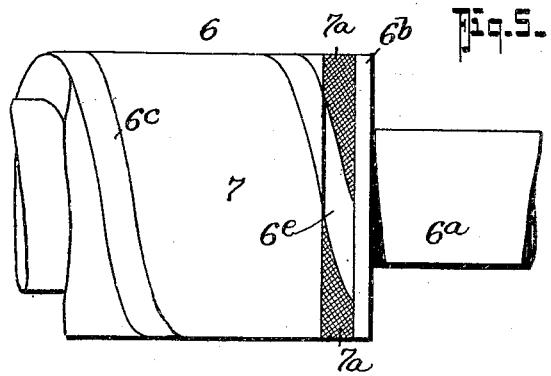
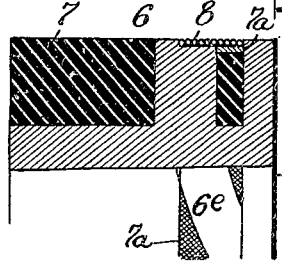
WITNESSES:
John T. Schrott
H. Woodard
INVENTOR
Arthur P. Wolfe.
BY
Fred G. Dieterich
ATTORNEYS.

UNITED STATES PATENT OFFICE.

ARTHUR P. WOLFE, OF BUFFALO, NEW YORK, ASSIGNOR TO HUNTLEY MFG. CO., INCORPORATED, OF SILVER CREEK, NEW YORK.

ROLL FOR CORN-HUSKING MACHINES AND THE LIKE.

959,904.  Specification of Letters Patent.  Patented May 31, 1910.

Application filed April 17, 1908. Serial No. 427,630.

*To all whom it may concern:*

Be it known that I, ARTHUR P. WOLFE, residing at Buffalo, in the county of Erie and State of New York, have invented certain new and useful Improvements in Rolls for Corn-Husking Machines and the Like, of which the following is a specification.

My invention in its generic nature has for its object to provide a roll of an improved construction whose surface is formed of a pliable or yieldable material and a metallic portion to coöperate with a scraper in such a manner that the scraper will not only perform its clearing or cleansing function on the rolls but the roll itself will act as a continuous sharpening device to maintain the sharpness of the scraper edge that is in engagement with the roll, and furthermore protect the yielding material of the roll from being gouged by the scraper.

More specifically my improved roll comprises a cylindrical body having a helical peripheral rib on its surface to form a helical groove in which a yieldable material is held flush with the outer surface of the rib whereby the straight edge of a scraper may simultaneously engage both the outer surfaces of the rib and the yielding material.

My invention also includes an improved means for securing the yieldable member in the groove.

The helical rib may be of any convenient pitch, that is, of only a part of a convolution per length of a roll, or a single convolution per length of the roll, or a plurality of convolutions per roll lengths, and the yieldable surface may be of any approved material, preferably of a lesser degree of hardness than that of the rib, as the essential features of my invention reside not alone in the specific material composing the roll surface, but particularly in the construction of the roll and the coöperative relation thereto of the scraper, etc.

In its more detail nature, the invention embodies those novel details of construction, combination and arrangement of parts, all of which will be first described, and then be specifically pointed out in the appended claims, reference being had to the accompanying drawings, in which:

Figure 1, is a perspective view of a roll and a scraper embodying my invention. Fig. 2, is an end elevation of a pair of rolls in their operative relation. Fig. 3, is a side elevation of the roll with the yieldable covering partly removed. Fig. 4, is a detail perspective view of one end thereof. Fig. 5, is a detail elevation thereof showing the parts before the securing wire is in place. Fig. 6, is the same view, the wire being in place. Fig. 7, shows the same parts after the wire has been fused. Fig. 8, is a detail view of the end of the yieldable strip, showing the linen covering therefor. Fig. 9, is a detail section on the line 9—9 of Fig. 6. Figs. 10 and 11, are elevations of modifications of the different pitches of ribs.

Referring now to the accompanying drawings, in which like letters and numerals of reference indicate like parts in all of the figures, 1 designates the support, in bearings $1^a$, of which the shaft portions $6^a$ of the rolls 6 are mounted. The supports 1 have projections $1^b$, in which the pivots $3^a$, of the supports 3, that carry the scrapers 2 are mounted. The supports 3 have projections 4, so that the projections 4 of one scraper may be connected to those of the other scraper by a spring 5, so that when the rolls are arranged in pairs, as shown in the drawings, the scrapers may be held against the rolls by a single spring 5.

The roll 6, which forms the essential part of my invention, it will be seen comprises a cylindrical body whose ends terminate in disks $6^b$ of greater diameter than the diameter of the body and between which disks $6^b$ the roll 6 carries a helical rib $6^c$ which may be wound at any desired pitch, as shown in Fig. 1 and Figs. 10 and 11 of the drawings.

The rib $6^c$ may be integrally formed with the body of the roll and is designed to leave a groove $6^d$ of helical formation from one end of the roll to the other between the disks $6^b$—$6^b$ in which groove $6^d$ a yieldable strip 7 is wound, the strip 7 being preferably constructed of rubber, or other suitable material, and in practice, is of such shape, that the strip 7 is cut with a slightly greater cross sectional area than the cross sectional area of the groove $6^d$, so that it may be stretched in putting the same onto the roll, and when the strip has been fastened to the roll, the outer surface of the roll will be flush, that is to say, the peripheral surface of the yielding member 7 will coincide with that of the rib 6ᶜ.

It will be noticed that the rib 6ᶜ, where it joins with the groove 6ᵈ is slightly cut away as at 6ᵉ to receive a wire 8 which is wound around the end of the yieldable member 7, and over which the rib 6ᶜ, to secure the yieldable member 6 in place, it being understood that this wire is tightly wound and that the depressions 6ᵉ of the rib 6ᶜ are just about as deep as the diameter of the securing wire 8.

In practice, the securing wire 8 is first tightly wound on and then solder is fused around it until it presents a practically smooth surface and in order to prevent damaging the material of the yieldable strips 7, a linen sheathing is provided over the ends of the strip which coincides in width with that of wire 8 so that the wire 8 when wound around the roll to secure the strip 7 in place may be wound on the linen surface 7ª, and hence the yieldable material of the strip 7 will be protected.

The scraper 2 may be an ordinary straight-edge scraper, as shown in the drawings, and by virtue of the helical rib 6ᶜ passing in contact with the scraper 2, the edge 2ˣ of the scraper will be maintained sharp by the action of the rib 6ᶜ thereon, the rib 6ᶜ serving, as it were, as a sharpener for the scraper edge, as well as a retaining means for the yieldable strip 7 that forms a part of the surface of the rolls and protects the yieldable member from being cut into by the scraper.

I desire it understood that the relative thickness of the rib 6ᶜ, as compared with that of the strip 7 may be varied from that shown in the drawings, and instead of the rib 6ᶜ being made the thinner of the two, the member 7 may be made the thinner, if found convenient in practice, as the relative proportions of the surface area of the strip 7 and the rib 6ᶜ are dependent upon the conditions met with in practice, although in practice, I prefer to make the surface area of the strip 7 greater than that of the rib 6ᶜ.

Instead of winding the yieldable member in the helical groove and securing it by the wires at the ends, I may vulcanize the yieldable member in the groove and hence retain it therein by its own rigidity.

It is to be particularly noted that by virtue of the helical rim the yieldable member will be fully protected from the action of the scraper blade edge and the helical rib will prevent such scraper edge cutting into the yieldable material and damaging the surface thereof.

From the foregoing description, taken in connection with the accompanying drawings, it is thought the complete construction, operation and advantages of my invention will be readily understood by those skilled in the art to which the invention appertains.

What I claim is:

1. A corn husking roll having a helical peripheral rib on its surface to form a helical groove and a yieldable material held in said groove, said peripheral rib and said yieldable material having their outer cylindrical surfaces coincident.

2. A corn husking roll comprising a cylindrical body, end disks carried thereby and spaced apart, a helical rib on the periphery of said body extending between said end disks to form a helical groove between said disks, and a strip wound in said helical groove and means for securing said strip at the ends.

3. A corn husking roll comprising a cylindrical body, end disks carried thereby and spaced apart, a helical rib on the periphery of said body extending between said end disks to form a helical groove between said disks, a strip wound in said helical groove, means for securing said strip at the ends, said last named means comprising a wire member secured around said strip and said rib ends.

4. A corn husking roll comprising a cylindrical body, end disks carried thereby and spaced apart, a helical rib on the periphery of said body extending between said end disks to form a helical groove between said disks, a strip wound in said groove, means for securing said strip at the end, said last named means comprising a wire member secured around said strip and said rib ends and fused together.

5. A roll for corn husking machines and the like comprising a cylindrical body having a peripheral helical rib, and the end disks between which said rib runs to form a helical groove from end to end of the roll, a strip wound in said groove with its outer surface flush with the outer surface of the rib.

6. A roll for corn husking machines and the like, comprising a cylindrical body having a peripheral helical rib, and the end disks between which said rib runs to form a helical groove from end to end of the roll body, a strip wound in said groove on its outer surface flush with the outer surface of the rib, said rib having its end provided with depressed portions, and means held in said depressed portions around said yieldable strip end to maintain the strip in place.

7. A roll for corn husking machines and the like, comprising a cylindrical body having a peripheral helical rib and the end disks between which said rib runs to form a helical groove from end to end of the roll body, a strip wound in said groove its outer surface flush with the outer surface of the rib, said rib having its end provided with depressed portions, means held in said depressed portions around said yieldable strip end to maintain the strip in place, said last named means comprising a wire member.

8. A roll for corn husking machines, and the like, comprising a cylindrical body having a peripheral helical rib to form a helical groove from end to end of the roll, a strip wound in said groove its outer surface flush with the outer surface of the rib, combined with a scraper held against the surface of the roll to engage the yieldable strip and said rib.

ARTHUR P. WOLFE.

Witnesses:
 FRANK E. SICKELS,
 EDWARD W. SIAMS.